Nov. 21, 1950     A. A. MARKSON     2,530,711
MEASURING DEVICE

Filed May 26, 1947     2 Sheets-Sheet 1

INVENTOR
Alfred A. Markson
BY *Gerald B. Tjoflat*
*His* ATTORNEY

Nov. 21, 1950  A. A. MARKSON  2,530,711
MEASURING DEVICE

Filed May 26, 1947  2 Sheets-Sheet 2

INVENTOR
Alfred A. Markson
BY Gerald B. Tjoflat
His ATTORNEY

Patented Nov. 21, 1950

2,530,711

UNITED STATES PATENT OFFICE 2,530,711

MEASURING DEVICE

Alfred A. Markson, Mount Lebanon, Pa., assignor, by mesne assignments, to Hagan Corporation, Pittsburgh, Pa., a corporation of Pennsylvania Application May 26, 1947, Serial No. 750,543

6 Claims. (Cl. 33—172)

This invention relates to measuring devices and more particularly to devices for measuring changes in length of a body where the expansion thereof may be the result of temperature and where it is highly desirable to know the degree of expansion at any time.

In the operation of gas turbines it is important to know how much expansion is occurring in the rotor shaft and rotor parts associated therewith in order that precautions may be taken to prevent the rotor of the turbine rubbing against the stator and the damage that might result therefrom.

An object of this invention is to provide a simple and accurate device for measuring small changes in length of a member which is subject to variations in temperature and which may be mounted in close proximity to the member whose changes in length are to be measured but which is capable of transmitting indications of such changes in length to any desired location or point.

A further object of the invention is to provide a device of the character referred to above which is not itself affected by temperature changes, and which is provided with a beam that as acted on oppositely by a tension spring and a pressure actuated member having a valve that operates to increase or decrease the pressure in the pressure actuated member whenever the forces of the spring and pressure actuated member are out of balance, the valve being always in neutral position when these forces are in balance and out of neutral position when they are out of balance.

A still further object of the invention is to provide a device such as described above in which the value of pressure established in the pressure actuated member may be measured or gauged as a direct function of the deflection being measured or determined.

Other objects of the invention will, in part, be apparent, and will, in part, be obvious from the following description taken in conjunction with the accompanying drawings in which.

Figure 1:
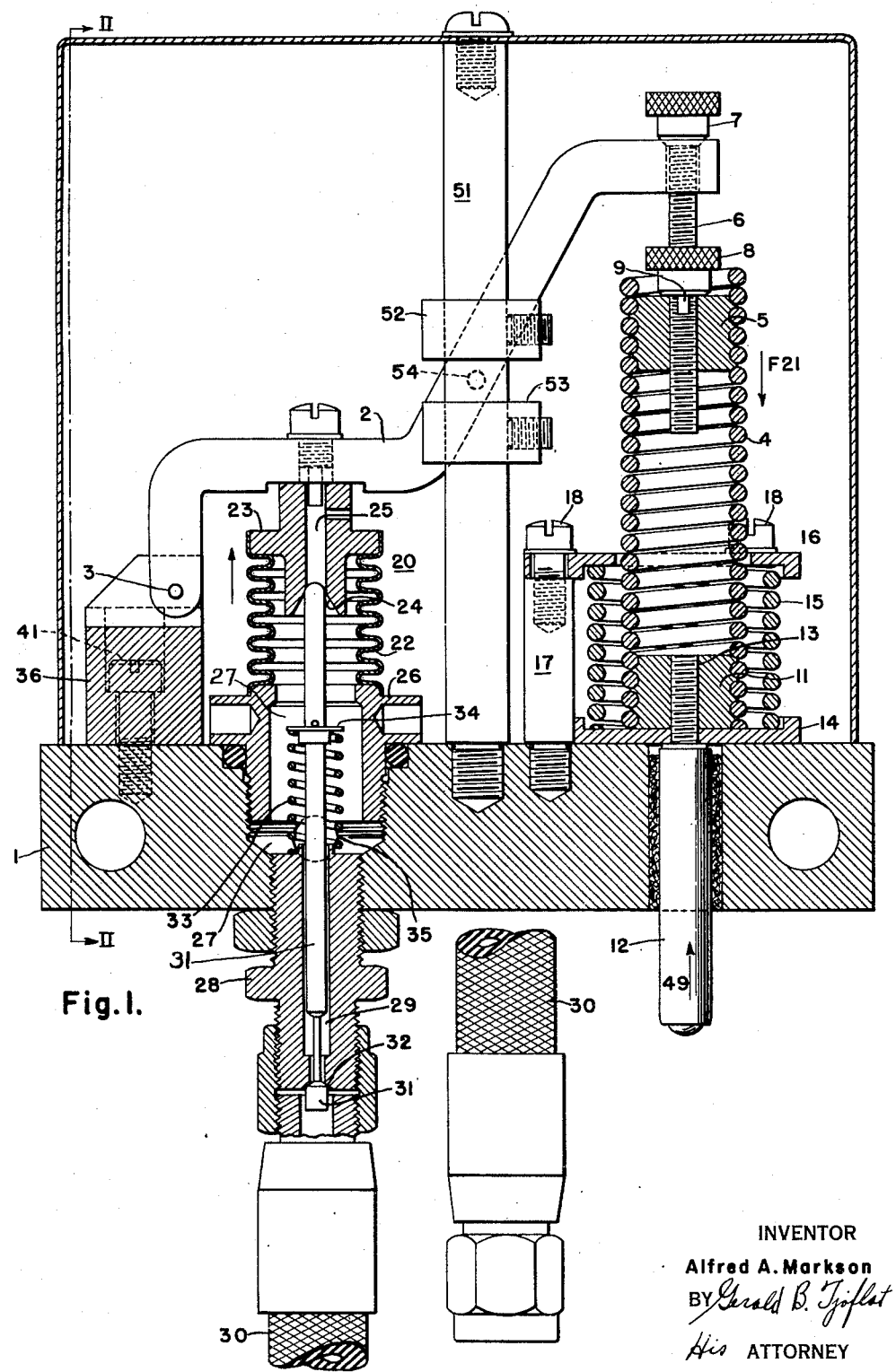
Figure 1 is a view partly in elevation and partly in section of a device arranged and constructed in accordance with an embodiment of the invention.
Figure 2:
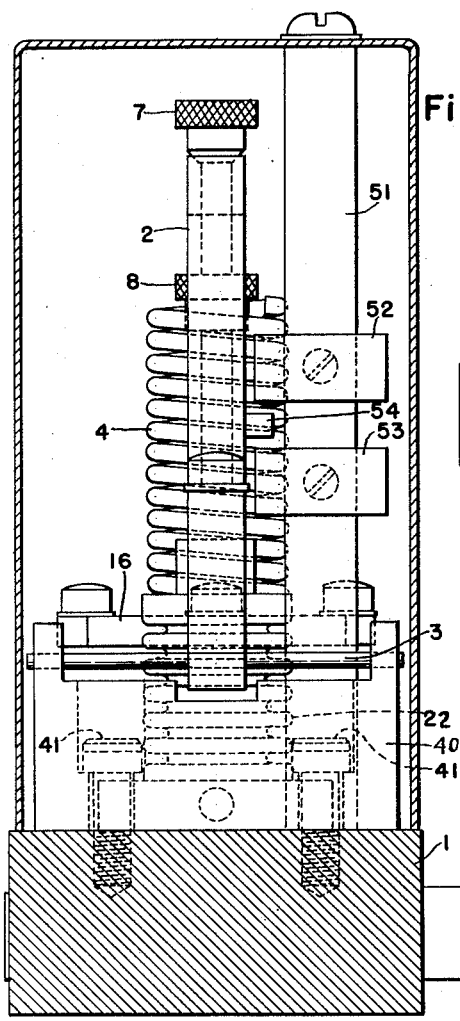
Fig. 2 is a view taken in section on line II—II of Fig. 1.

The device as shown in Figs. 1 and 2 comprises a base 1 and a beam 2 mounted at one end on a fulcrum 3 and having a tension spring 4 connected to the opposite end of the beam. Spring 4 is connected to the beam by means of an adjustable block 5 which has screw thread engagement with the turns of the spring. It is preferred that the spring be connected to the free end of the beam. A screw 6 which extends through the free end of beam 2 into block 5 has screw thread engagement therewith. The upper end of the screw is formed with a head 7 and bears on the upper side of the beam.

Screw 6 is provided with an adjustable nut 8 which is coupled thereto by means of a key 9 so that by turning nut 8, block 5 may be turned into or out of the spring to increase or decrease the number of active turns of the spring as may be required in the adjustment of the device for proper operation. Screw 6 may be turned without advancing nut 8 along the screw threads thereof to raise or lower block 5 to thereby adjust the initial tension in spring 4.

The lower end of spring 4 is connected to a movable member or element such as a block 11 which has threaded engagement with the turns of the lower end of the spring and a feeler 12. The upper end of the feeler 12 has a screw threaded part 13 that is threaded through a bearing plate 14 and into block 11. Feeler 12 is the part which receives motion or movement of the member whose changes in length are being measured. Associated with spring 4 is a compression spring 15 which is preferably mounted coaxially with spring 4 and between the bearing plate 14 and an upper bearing plate 16. Bearing plate 16 is mounted on posts 17 which are secured to base 1 at their lower ends, plate 16 being secured to post 17 by means of screws 18.

When feeler 12 has no force imposed on it, compression spring 15 forces the lower bearing plate 14 against base 1. When a force is imposed on member 12 in a direction to move it upwardly, that force is taken by compression spring 15, but as the bearing plate 14 moves upwardly with feeler 12, the tension in spring 4 changes. This change in tension results in a balancing force being imposed on beam 2 by a balancing means 20.

As stated above, spring 4 is a tension spring, that is, it is in tension when no force is imposed on feeler 12 and the lower end of the spring is urged to its lowermost position by the compression spring 15. It will be apparent that the force setting up the tension in spring 4 is in the direction of arrow F—21. If feeler 12 has a force imposed thereon causing it to move upwardly, it will be apparent that the tension in spring 4 will be decreased. The function of the balancing means 20 is to exert a force on beam 2 in such a direction that the tension force F—21 in spring 4 will return the beam to a predetermined position, i. e., to a position of balance. The balancing means 20, as will be apparent from the following, not only acts to set up a force on beam 2 that always balances the tension force in spring 4, but it also serves to measure the extent of movement of feeler 12.

Means 20 comprises a bellows 22 having a bearing 23 at its upper end which is so secured to the bellows as to seal the upper end. The bearing member is provided with a valve seat 24 and an exhaust passage 25 which leads to atmosphere. The lower end of the bellows is coupled to a valve body 26 which is threaded into a chamber 27 in the base. A valve body 28 is connected to chamber 27 being threaded into it from the bottom of the base. Valve body 28 has a passage 29 which provides communication between a source of supply of fluid pressure such as compressed air, the latter being supplied to the valve body by means of a conduit 30. A valve stem 31 extends through the passage 29 of the valve body. One end of the valve stem seats in valve seat 24 and the other end is provided with a valve element 31' which seats on an inlet seat 32 in body 28. A spring 33 may be provided to urge the valve stem in a direction to cause valve 31' to seat on inlet seat 32. This spring may be concentric with the valve stem and disposed between the inner end of valve body 28 and a collar 34 keyed to the stem.

A port 35 is formed laterally in the base which connects with chamber 27, port 35 being connected to a pipe 37 to which a sending line 38 may be connected for transmitting pressure established in chamber 27 as the result of movement of feeler 12.

Figure 3:
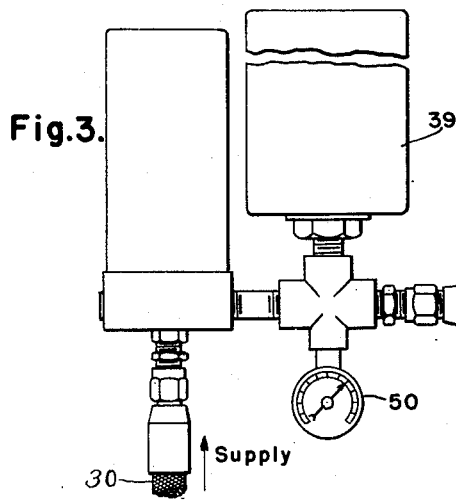
Fig. 3 is a view showing the general outline of the device of Figs. 1 and 2 provided with a damping device in the pressure sending line thereof.

As shown in Fig. 3, a volume chamber 39 may be provided and connected to the sending line 38 to prevent vibration of the valve stem 31. The function and operation of the volume chamber 39 in connection with a valve such as illustrated in the drawing is disclosed in R. R. Donaldson Patent No. 2,357,318, issued the 5th day of September, 1944.

As may be seen in Fig. 1, spring 4 is relatively long compared to the length of bellows 22, and this accounts for the shape of beam 2.

In a device of this character, it will be apparent that the fulcrum on which beam 2 is mounted should be substantially frictionless and that the tension spring 4 should have a substantially constant modulus of elasticity over a wide temperature range so that changes in temperature of the spring will not affect the accuracy of the measurements to be made by the device. Certain nickel-chromium-iron alloys are especially suited for this purpose because their moduli of elasticity are constant over a wide temperature range.

In the publication "Iron & Nickel Alloys of the Invar and Elinvar Types, copyright 1924, by the International Nickel Company, Inc., Development and Research Division," alloys suitable for my purposes are described. For example, an alloy consisting of 36% nickel, 12% chromium and the balance iron has a substantially constant modulus of elasticity over a temperature range from —150° F. to +350° F.

A frictionless fulcrum for beam 2 may be provided by means of a wire which passes through the beam and has its opposite ends fixed in a support block 40 rigidly secured to the base by means of screws 41. The wire is preferably secured to the beam so that the one cannot turn in the other, likewise the ends of the wire are secured fast to the support block. Thus turning of the beam on its fulcrum results in twisting of the wire.

Figure 4:
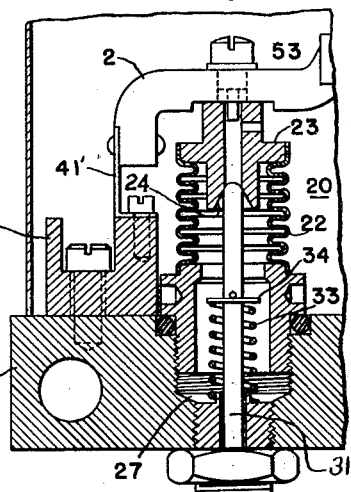
Fig. 4 is a partial view in section showing a modified form of fulcrum for the beam of the device shown in Figs. 1 and 2.

Another form of frictionless fulcrum is indicated in Fig. 4. As shown in this view, an L-shaped spring 41' is employed in lieu of a wire. The base of the L of this spring is secured to the support block and the leg of the L is secured to the beam.

The device as shown in the drawings may, for example, be employed to measure changes in length of the shaft of a gas turbine where it is important to know at all times the clearance that exists between the rotor and stator blades. The clearance beween the rotor and stator blades can be determined by measuring the expansion of the turbine shaft relative to the turbine casing or stator.

Figure 5:
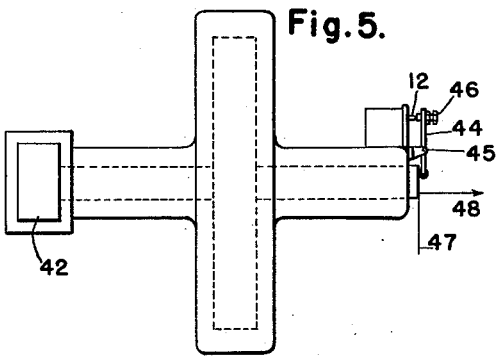
Fig. 5 is a schematic view of a gas turbine having the device embodying the invention mounted thereon in a position to measure changes in length of the turbine shaft Throughout the drawings and specification, like reference characters indicate like parts.

As diagrammatically illustrated in Fig. 5, one end of the shaft of the turbine is fixed in a thrust bearing 42 and the other end is free to expand or contract. The expansion and contraction of this shaft with respect to the casing may be conveniently measured by the device shown in Figs. 1 and 2 by mounting it on the turbine in a position where changes in length of the shaft may be transmitted to feeler 12 by means of a lever 44 which is fulcrumed on a pivot 45. One end of lever 44 is in contact with the end of the turbine shaft and the other end is in contact with the feeler 12. An adjustment 46 may be provided between lever 44 and feeler 12.

If it be assumed that line 47 represents the inner point of the shaft in terms of expansion, then it will be apparent that as the shaft expands in the direction of arrow 48, lever 44 will turn counter-clockwise and impose a force on feeler 12 causing it to move to the left as seen in Fig. 5, or upwardly in the direction of arrow 49 as seen in Fig. 1.

Device 1 is so adjusted that when the feeler 12 is in its lowermost position as shown in Fig. 1, a pressure will be established in chamber 27 of means 20 of such a value that the force exerted upwardly by bellows 22 will establish the predetermined tension force desired in spring 4. The value of this pressure may, for example, be 30 pounds per square inch gauge. When so adjusted, the pressure in chamber 27 will decrease to a value of 5 pounds per square inch gauge when the feeler element has been moved upwardly to the limit of its range of travel. For intermediate positions of the feeler, corresponding intermediate values of pressure will be developed in chamber 27.

Assuming, therefore, no force is being exerted on the feeler 12 and that it is in the position as shown in Fig. 1, then it will be apparent that the tension force F-21 acting downwardly on the free end of the beam will be at a maximum, and when this force is acting downwardly, bearing member 23 will push the valve stem downwardly causing the valve element 31 to be unseated allowing pressure from the supply source to enter chamber 27 and build up to a value required to expand the bellows and move bearing element 23 upwardly to a point where valve element 31 will seat and close the inlet port. When this occurs, the force exerted upwardly by the bellows balances the force exerted downwardly by spring 4. When this balance occurs, it will be apparent that the exhaust seat 24 is closed by the upper end of the valve stem.

It will be observed that the exhaust seat 24 and the inlet seat 32 are shown closed when the valve stem is in a fixed position which also means they are both closed when the free end of the beam is in a fixed position. For convenience, this fixed position will be called neutral position.

When the force imposed on feeler 12 in the direction of arrow 49 increases, thrust plate 14 and the lower end of spring 4 move upwardly whereby the tension in spring 4 is decreased. When this decrease occurs, the pressure acting on bellows 22 will cause the bellows to expand so that the upper end moves upwardly moving the element 23 with it in a direction to cause the valve seat 24 to lift off the upper end of the valve stem, whereby pressure is relieved through passage 25 to the atmosphere. When the pressure is relieved in chamber 27, the bellows will contract and return the beam to its neutral position when the force exerted by the bellows balances that exerted by spring 4. When the feeler 12 moves upwardly still more in a response to a change in length of the turbine shaft, the above described operation will be repeated, and for each increment or change in length of turbine shaft, the pressure in chamber 27 will be decreased to a value in which the force exerted by the bellows on beam 2 balances by the force exerted by spring 4. This operation will continue until the feeler element has reached the limit of its travel, at which point the pressure in chamber 27 will be at the minimum value for which the device was initially adjusted.

The pressures established in chamber 27 are therefore proportional to the linear expansion or contraction of shaft 48 with reference to the turbine casing. The pressure in chamber 27 may be measured by means of a gauge 50, the scale of which may be calibrated in terms of linear expansion of the shaft so as to provide a direct reading of the expansion of the shaft at any time. The pressures sent out through pipe 38 may also be utilized to actuate devices for sounding alarms or for shutting down the turbine as will be apparent to those skilled in this art.

If desired, movement of beam 2 may be confined within predetermined limits. This may be accomplished by providing a post 51 having stops 52 and 53 thereon between which a pin or lug 54 secured to the beam moves. When the pin hits stop 52, the upward or counterclockwise turning of the beam is limited and when the pin engages stop 53, turning of the beam in a clockwise direction is limited. Stops 52 and 53 may be adjusted up or down on post 51 to provide the desired limits of travel of beam 2.

It will be apparent to those skilled in this art that various modifications and changes may be made in the device herein disclosed as representing a preferred form of invention without departing from either the spirit or the scope thereof. Therefore, what I claim as new and desire to secure by Letters Patent is:

1. A device for measuring changes in length of a member with reference to another member, said device being stationary with reference to said members and comprising a beam having a substantially frictionless fulcrum, a movable element, a tension spring having one end connected to said beam and the other end connected to said movable element and exerting a force on said beam tending to turn it in one direction about said fulcrum, said movable element having a feeler adapted to engage a member whose change in length is to be measured, a pressure actuated element operatively connected to said beam and disposed to exert a turning force on said beam which opposes said spring force, a valve actuated jointly by said beam and said pressure actuated element and disposed to establish a pressure in said pressure actuated element of such value that the turning force exerted thereby on said beam balances the turning force exerted by said tension spring thereon, and means for measuring the pressure in said pressure actuated element as a function of said changes in length being measured.

2. A deflection measuring device comprising a beam mounted to pivot about a fulcrum, a movable member having a deflection feeler, a tension spring connected to said beam and to said movable member and exerting a force thereon tending to turn said beam in one direction about said fulcrum, said spring being of a metal having a substantially zero temperature coefficient of expansion, a compression spring coupled to said movable member for urging the same in a direction tending to stress said spring in tension, a hollow body having a pressure deflectable member disposed to exert a force on said beam in a direction opposing the force exerted thereon by said tension spring, a valve disposed to control the admission and discharge of a fluid pressure to said body to act on said deflectable member in response to movement of said beam for establishing such a value of pressure in said deflectable member that the force exerted thereby on said beam balances the force exerted by said tension spring, the tension in said tension spring being modified in response to movement of said feeler, and means for measuring the pressure in said pressure deflectable member as a function of the deflection being measured.

3. A device according to claim 1 characterized by the fact that the pressure actuated element and valve comprise a bellows having at one end a closure member provided with an exhaust port seat, the closure member being connected to said beam, and at the other end a valve body having an inlet port seat adapted for connection to a source of supply of fluid pressure, and a valve stem disposed within the body, the opposite ends of said stem being adapted to seat on said exhaust and inlet port seats, respectively, both of said seats being closed when the pressure in said bellows exerts a force on said beam that balances the force exerted thereon by said tension spring, the inlet port being opened as the bellows contracts when the force of the tension spring exceeds the force of the pressure in the bellows, the inlet port being closed and the exhaust port opened when the force exerted by said bellows on said beam exceeds the force of said tension spring.

4. A device for measuring changes in length of a member with reference to another member, said device comprising a beam having a substantially frictionless fulcrum, a tension spring connected to said beam and exerting a force thereon tending to turn it in one direction about said fulcrum, a pressure actuated balancing means exerting a force on said beam tending to balance the turning force of said spring, said balancing means including a body having a chamber therein and a flexible member communicating therewith, said flexible member exerting a force on said beam proportional to the pressure in said chamber, a valve actuated in response to the unbalance between the forces exerted on said beam by said spring and said flexible member for establishing in said pressure chamber a pressure of such value that the said forces acting on said beam are in balance, and means for modifying the tension of said tension spring in accordance with the relative changes in length between said one member and said other member.

5. A device according to claim 2 characterized by the fact that the pressure actuated element and valve comprise a bellows having at one end a closure member provided with an exhaust port seat, the closure member being connected to said beam, and at the other end a valve body having an inlet port seat adapted for connection to a source of supply of fluid under pressure, and a valve stem disposed within the body, the opposite ends of said stem being adapted to seat on said exhaust and inlet port seats, respectively, both of said seats being closed when the pressure in said bellows exerts a force on said beam that balances the force exerted thereon by said tension spring, the inlet port being opened as the bellows contracts when the force of the tension spring exceeds the force of the pressure in the bellows, the inlet port being closed and the exhaust port opened when the force exerted by said bellows on said beam exceeds the force of said tension spring.

6. A device for measuring changes in length in accordance with claim 4 characterized by the fact that the balancing means comprises a bellows having at one end a closure member provided with an exhaust port seat, the closure member being connected to said beam, and at the other end a valve body having an inlet port seat adapted for connection to a source of supply of fluid under pressure and a valve stem disposed within the body, the opposite ends of said stem being adapted to seat on said exhaust and inlet port seats, respectively, both of said seats being closed when the pressure in said bellows exerts a force on said beam that balances the force exerted thereon by said tension spring.

ALFRED A. MARKSON.

REFERENCES CITED

The following references are of record in the file of this patent:

UNITED STATES PATENTS

| Number | Name | Date |
|---|---|---|
| 2,374,154 | Moore | Apr. 17, 1945 |